(No Model.) 2 Sheets—Sheet 1.
B. B. FARNHAM.
EXPANSIBLE PULLEY.
No. 522,658. Patented July 10, 1894.
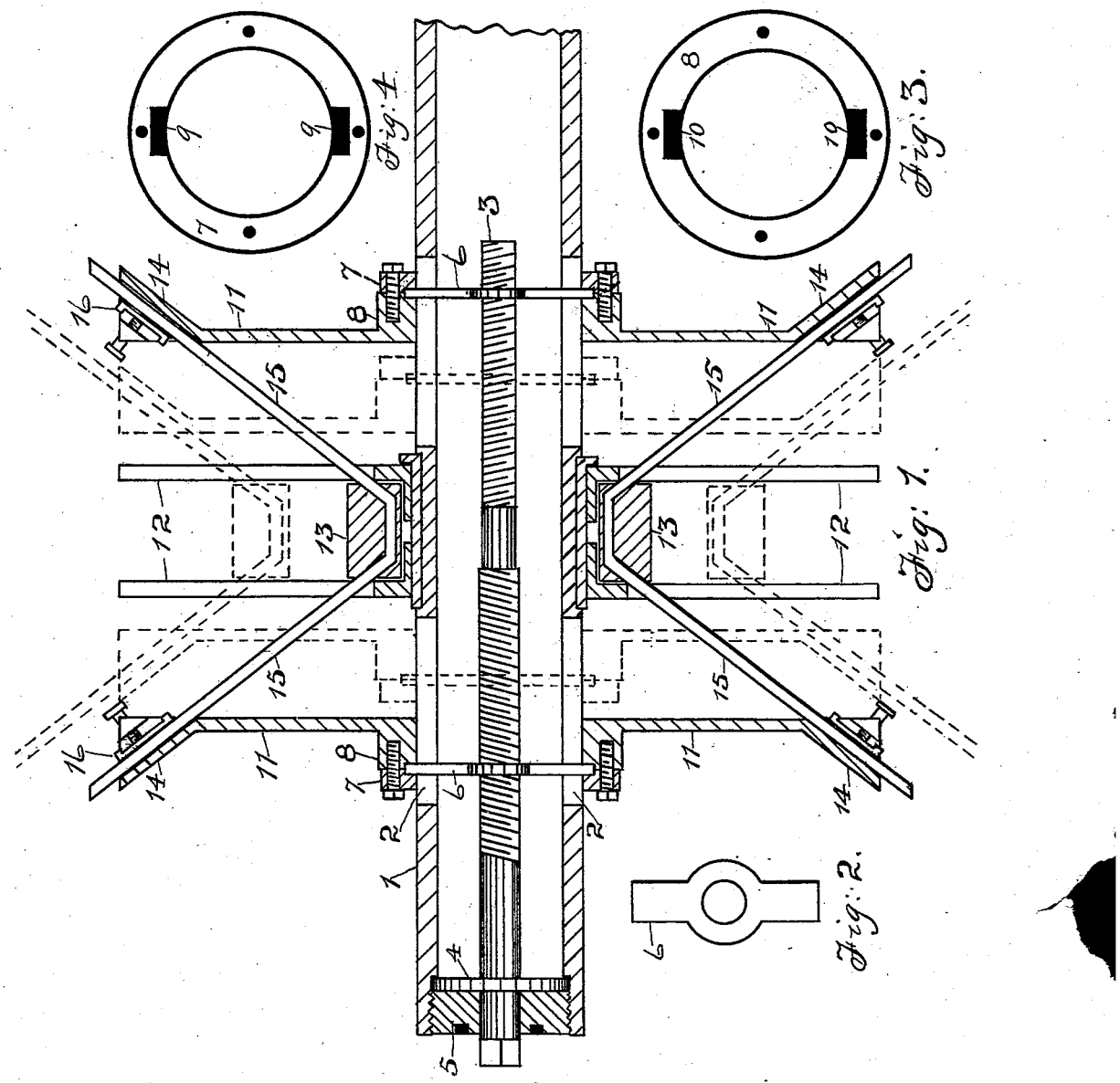
Witnesses
J. F. Harris
A. M. Turner
Inventor
Bion B. Farnham.
By his Attorney H. M. Brown

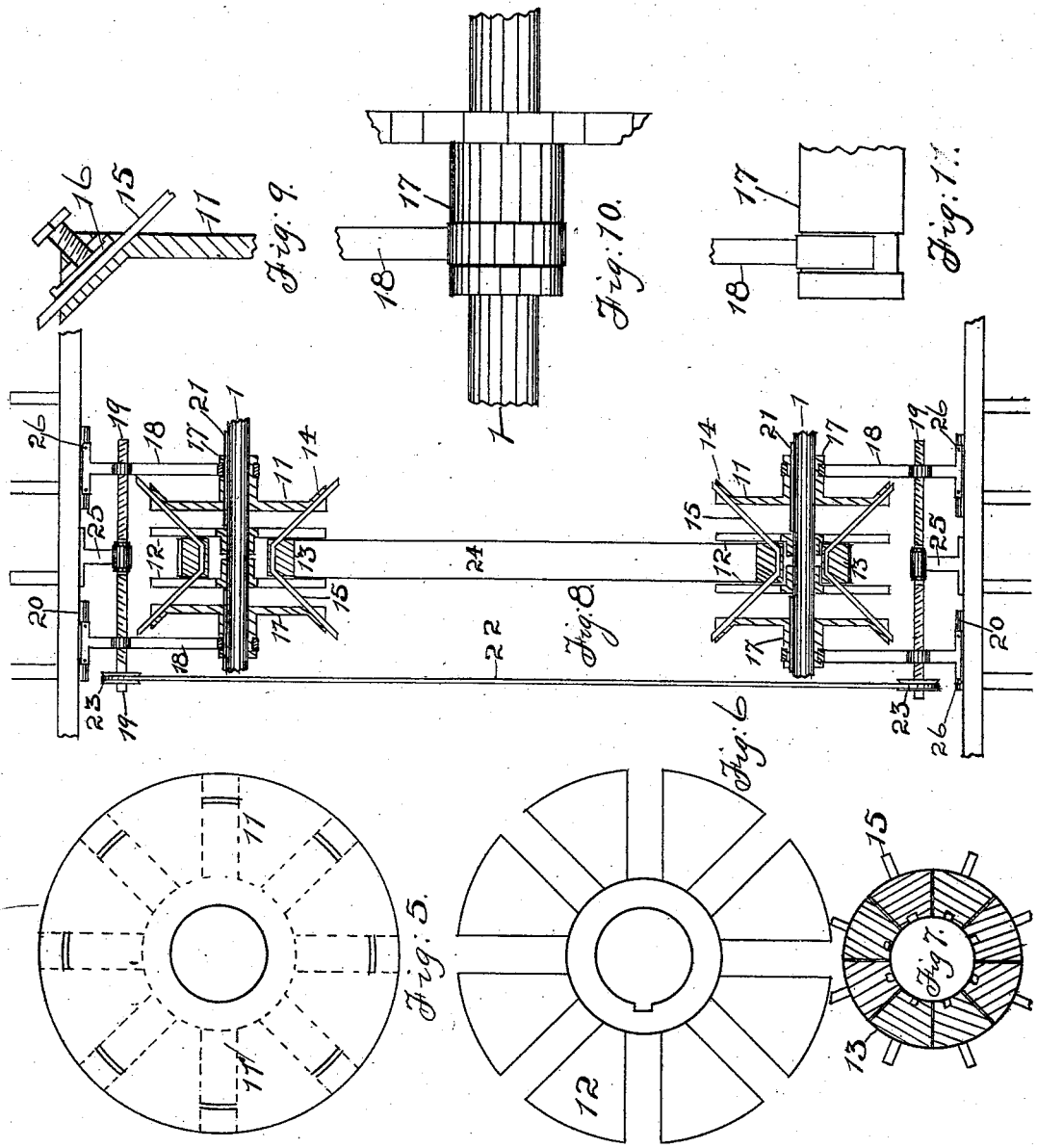

UNITED STATES PATENT OFFICE.

BION B. FARNHAM, OF CASTLETON, NEW YORK.

EXPANSIBLE PULLEY.

SPECIFICATION forming part of Letters Patent No. 522,658, dated July 10, 1894.

Application filed February 7, 1894. Serial No. 499,895. (No model.)

*To all whom it may concern:*

Be it known that I, BION B. FARNHAM, a citizen of the United States, residing at Castleton, Rensselaer county, New York, have invented certain new and useful Improvements in Expansible Pulleys; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a new and improved expansible pulley.

In the drawings Figure 1 shows a vertical sectional view of one form of my pulley in operative construction; Fig. 2 a front elevation of a winged nut; Fig. 3 an end view of the hub of my actuating disk; Fig. 4 a front elevation of a recessed collar; Fig. 5 a plan view of the front face of the actuating disk; Fig. 6 a plan view of the face of my guide plate; Fig. 7 a vertical sectional view of my segmental pulley block; Fig. 8 a vertical sectional view of another form of my pulley, showing an overhead and a floor pulley belted; Fig. 9 a vertical sectional view of the top edge of my actuating disk enlarged, showing the guide way therein through which the arm of the segments of the pulley move; Fig. 10 a side elevation of a portion of my actuating disk and the form of hub shown in Fig. 8 but enlarged; Fig. 11 a side elevation of one end of the hub, showing a U-shaped yoke in connection therewith.

The numeral 1 shows the shafting on which my pulley is hung and in Fig. 1 it is shown as tubular. Slots 2 are cut through the tubular shaft and centrally located therein is a right and left threaded bolt 3 having a flange 4 at one of its ends set in an annular recess in the end of the shaft formed by boring out the end and internally threading it and screwing the annular plug 5 in the end, leaving room in the recess thus formed for the flange 4 to easily rotate therein when the bolt 3 is rotated, said bolt having its protruding end squared to receive the eye of a crank for that purpose.

In the tubular shaft 1 are winged nuts 6. They are dropped sidewise through the slots 2 and turned half round so that the bolt will enter them and the ends of the wings rest in recesses 10 in the face of the hubs 8 and in recesses 9 in the face of collar 7, the collars 7 being bolted to the face of the hubs 8 as shown. This holds winged nuts 6 firmly and prevents their turning when the bolt 3 is turned by the crank heretofore mentioned. The bolt 3 is entered in the nuts 6 by passing the reduced end of the bolt through left hand nut 6 and the bolt revolved until that nut is well on the bolt, when the reduced end is entered in the right hand nut 6 and its revolutions reversed until the right hand nut is well on the bolt, the threads on the bolt being arranged to cause an equal travel of the nuts 6 as the bolt revolves. 11 shows my actuating disks which have slanting guide ways 14 and channels cut through said guide ways in which the arms 15 rest and slide, a gib 16 being set on the arm in the said channel to receive the thrust of the end of a set screw as shown, the gib 16 lying easily or loosely on the face of the arm allowing the arm 15 to slide.

In Fig. 5 the radiating dotted lines 11' indicate strengthening ribs on the outer face of my actuating disks 11 not shown in the other figures. 12 indicates slotted guide plates keyed to the shaft preferably, as shown, and between guide plates 12 rests my movable segmental pulley block 13, which is preferably of metal and cast upon the lower ends of the arms 15, preferably, a vertical cross section of which is seen in Fig. 7.

While I prefer to cast the segments on the arms, I do not confine myself to this method of attaching them, as they may be attached in any well known manner.

The full lines in Fig. 1 show my pulley contracted to its smallest diameter while the dotted lines show it expanded, and in the dotted lines showing the actuating disks 11 I have omitted to show the gibs 16 to avoid confusion in the drawings.

Before proceeding to describe the form of device shown in Figs. 8, 10 and 11, I will explain the operation of that form shown in Fig. 1, which is as follows: The pulley being hung on a shaft ready for use, and as shown in Fig. 1, it would be contracted to its smallest diameter. To expand it or increase its diameter, a crank is set upon the squared protruding end of the bolt 3 and turned, when the threading will, by means of the threaded winged nuts 6, force the actuating disks 11 inward, or toward the guide plate 12, on account of the right and left threading of the opposite ends of the bolt 3. As the actuating disks 11 are set upon the shaft 1 so as to slide easily thereon longitudinally, the inward motion or movement given said disks 11 causes arms 15 to slide under gibs 16 and in the channels in the slanting guide ways 14, and as the arms 15 are rigid (and preferably made of steel square or rectangular in cross section), they rise carrying the segments 13 of the pulley upward with them between the guide plates 12, thus expanding the pulley. By turning the crank oppositely the actuating disks 11 will recede from the guide plates 12 and the arms 15 and the segments 13 will fall, reducing or contracting the pulley. A hand or bolt wheel may be set upon the squared end of the bolt 3 if desired, whereby to rotate it.

While I have shown the preferred form of mechanism in constructing this form of my pulley, I do not confine myself thereto, as I claim and use all known equivalents for the various parts shown.

Referring to Fig. 8, I proceed to a description of the form and manner of setting up the pulleys therein shown.

The numeral 1 indicates a solid shaft, and 11 actuating disks sliding longitudinally on the shaft and on the splines 21, the hub 17 being slotted to receive the splines, said splines also causing the disks 11 to rotate with the shaft, said disks being similar in construction to those heretofore fully described and shown in Fig. 1. The hubs of the disks 11 have an annular recess in which the collars on the ends of the arms 18 rest, which allows the hubs to freely rotate in the collars. The arms 18 are movably attached to blocks or rests 20, attached to the floor and ceiling, or other convenient object so that the arms 18 may have a lateral or sliding motion, and this is done by the pins 26 shown in the arms sliding in grooves in the blocks 20 which pins also serve to hold the arms 18 to the blocks 20. Through threaded eyeholes in the arms 18, passes the right and left threaded bolt 19, which is revolubly hung in the hanger 25, and to the end of the bolt is attached a sprocket or other wheel 23, with the sprockets of which the wire cable 22 engages (a chain may be used if desired). Fig. 8 shows a floor and overhead pulley belted by belt 24, the two pulleys being similar in construction.

It will be noticed that lower right and left threaded bolt 19 has its threads cut oppositely to those on overhead bolt 19, i. e., the left hand end of overhead bolt 19 is threaded right, while the left end of lower bolt 19 is threaded left, and where the right hand end of overhead bolt 19 is threaded left, the right hand end of lower bolt 19 is threaded right hand. This arrangement of the pulleys allows of expansion and contraction while the pulleys are in operation, and also of expanding one pulley while the other simultaneously contracts, thus allowing of "speeding up" one of the pulleys when desired.

The operation of this form of my device is as follows: The pulleys being set and belted, it many times becomes necessary, especially with pulleys used in driving machinery used in paper making, to take up the slack of the belts or to "speed up" or "slacken down" the pulleys, as the case may be. With my device shown in Fig. 8, all that is necessary to do to accomplish this speeding or slackening is to draw on cable 22, when the bolts 19 will rotate and by means of the right and left threading the sliding arms 18 will spread or draw together in accordance with the direction in which the bolts 19 rotate. If arms 18 expand or spread, they draw the actuating disk 11 and its hub 17 outward along shaft 1 and spline 21, thus causing the arms 15 and segments 13 to fall, thus contracting the pulley but, if sliding arms 18 draw inward or toward each other, then actuating disks 11 are pushed inward along the shaft 1 and spline 21, causing segments 13 to expand, the arms 15 sliding over offset 14 precisely as described in the description herein concerning Fig. 1.

It will be noticed that as the two pulleys are arranged in Fig. 8, if the cable 22 is drawn upon so as to expand one of the pulleys, the other will contract because of the arrangement of the threads on the bolts 19, as hereinbefore described, and this allows of "speeding up" either of the pulleys desired, because if one is contracted and the other expanded, the expanded pulley will drive the contracted one with greater rotary speed.

It is evident that by omitting the floor pulley shown in Fig. 8 and using a hanging cable 22, the upper pulley may be expanded and contracted at will, and this expansion and contraction may be accomplished without stopping the machinery or the shaft 1.

In Fig. 8 it will be noticed that the overhead pulley is somewhat expanded while the lower pulley is fully contracted, and therefore, the lower pulley is "speeded up." While only a small amount of contraction and expansion is shown in these two pulleys, it is evident that any amount thereof commensurate with the size of the pulleys may be had.

In Fig. 11 I have shown a U-shaped yoke 23, which may be used instead of the strap shown at the ends of the arms 18.

Having fully described my invention, so that those skilled in the art to which it appertains may make and use the same, what I claim, and desire to secure by Letters Patent, is—

1. An expansible pulley consisting of a tubular shaft portion and a revoluble bolt in said tubular shaft, said bolt having a portion thereof threaded left hand and a portion thereof threaded right hand, the tubular shaft having slots through its walls, and threaded winged nuts in the tubular shaft, the threads of one of said nuts being arranged to mesh with the right hand threading on the bolt and the threads of the other arranged to mesh with the left hand threading thereon, the wings of the nuts projecting through the passage ways in the walls of the tubular shaft, disks arranged to slide on said shaft, the ends of the wings of the said nuts being held securely to said disks and arranged to revolve with them, said disks having guide ways near their peripheries, slotted guide plates fixed to the shaft, and a segmental pulley block between the guide plates and arms attached to the segments thereof, said arms passing through the slots in the guide plates and resting on and arranged to slide over the guide ways on the disks when said disks are moved from or toward the guide plates, the said disks being arranged to move from each other when the bolt is revolved in one direction, and toward each other when the revolution of the bolt is reversed, in order that the segments of the pulley block may be expanded and contracted, substantially as and for the purposes described.

2. An expansible pulley consisting of a shaft portion and disks arranged to slide thereon, said disks having guide ways at or near their peripheries and means for sliding both disks on the shaft, and slotted guide plates attached to the shaft and a segmental pulley block located between the guide plates, and arms attached to each segment, said arms passing through slots in the guide plates and arranged to slide over the guide ways on the disks, in order that when the disks are moved toward each other the segmental pulley block will expand, and when the disks are moved from each other the said pulley block will contract substantially as shown and described.

3. An expansible pulley consisting of a shaft portion and disks arranged to slide thereon, said disks having guide ways at or near their peripheries and means for sliding both disks on the shaft, and slotted guide plates attached to the shaft, and a segmental pulley block located between the guide plates and arms attached to each segment, said arms passing through the slots in the guide plates and arranged to slide over the guide ways on the disks, in order that when the disks are moved toward each other the segmental pulley block will expand and when the disks are moved from each other said pulley block will contract, in combination with another corresponding pulley and means to expand one and to contract the other simultaneously substantially as shown and described.

In testimony whereof I affix my signature in presence of two witnesses.

BION B. FARNHAM.

Witnesses:
W. M. BROWN,
J. F. HARRIS.